(12) United States Patent
McKinion (10) Patent No.: US 7,016,340 B1
(45) Date of Patent: Mar. 21, 2006

(54) SYSTEM AND METHOD FOR TESTING A VOICE GATEWAY

(75) Inventor: James P. McKinion, Austin, TX (US)

(73) Assignee: General Bandwidth Inc., Austin, TX (US)

( * ) Notice: Subject to any disclaimer, the term of this patent is extended or adjusted under 35 U.S.C. 154(b) by 847 days.

(21) Appl. No.: 10/000,714

(22) Filed: Oct. 26, 2001

(51) Int. Cl.
*H04L 12/66* (2006.01)
*H04L 12/26* (2006.01)

(52) U.S. Cl. ................... 370/352; 370/241; 370/249

(58) Field of Classification Search ........ 370/351–356, 370/249, 252, 401, 466; 709/226–229, 235
See application file for complete search history.

(56) References Cited

U.S. PATENT DOCUMENTS

| | | | | |
|---|---|---|---|---|
| 5,477,531 | A | * | 12/1995 | McKee et al. ............... 370/249 |
| 6,466,548 | B1 | * | 10/2002 | Fitzgerald ................... 370/249 |
| 6,771,763 | B1 | * | 8/2004 | Hagirahim et al. ......... 379/219 |
| 2002/0015387 | A1 | * | 2/2002 | Houh .......................... 370/250 |
| 2002/0141392 | A1 | * | 10/2002 | Tezuka et al. .............. 370/352 |

OTHER PUBLICATIONS

Webpage entitled "Optixia Traffic Generation & Analysis Platform", Ixia—Optixia, at internet <http://www.ixiacom.com/products/chassis/OPTIXIA.php>, Printed Oct. 3, 2001.
Webpage entitled "High Density VoP Architecture", IEC: Online Education, at internet <http://www.iec.org/online/tutorials/voice_packet/topic03.html?Next.x=43&Next.y=11>, Printed Oct. 3, 2001.
Webpage entitled "Functional Testing: Ground-Breaking Functional Testing using the Spirent Adtech AX/4000", SpirentCom—Marcom, at internet <http:/www.lightreading.com/testing/spirent/sc_adtech.html>, Printed Oct. 3, 2001.
Webpage entitled "Adtech Ax/4000: 10 Gbps Generator/Analyzer Test Module with OC-192 POS/BERT/10GBASE-W Ethernet Interface", at internet <www.spirentcom.com>, 2001.
Webpage entitled "Spirent Communications Wins Coveted Industry Recognition for Latest Product Launches", SPIRENT News, at Internet <http:/www.spirent.com/news/767.html>, Printed Oct. 3, 2001.

* cited by examiner

*Primary Examiner*—Steven Nguyen
(74) *Attorney, Agent, or Firm*—Baker Botts L.L.P.

(57) ABSTRACT

A method for testing a voice gateway includes the operation of transmitting a first series of network packets containing test data from test equipment to a network interface of the voice gateway. After the test data has been converted by the voice gateway from a network format to a telephony format and then converted back to a network format, the test equipment receives a second series of network packets containing the test data. The test equipment then analyzes the test data in the second series of network packets to determine performance characteristics of the voice gateway. The operation of analyzing the test data may include the operation of identifying bytes from the test data with byte values that represent idle insertion by a telephony interface and/or the operations of determining elapsed time between transmission and reception of the test data by the test equipment.

24 Claims, 4 Drawing Sheets

SYSTEM AND METHOD FOR TESTING A VOICE GATEWAY

TECHNICAL FIELD OF THE INVENTION

This invention relates generally to the field of telecommunications and, in particular, to gateway systems for providing voice service over packet-based or network-based communications links such as broadband. More particularly, the present invention relates to a system and method for testing a voice gateway.

BACKGROUND OF THE INVENTION

Digital subscriber line (DSL) technology was initially deployed to provide data-only service as a replacement for slower-speed, dial-up modems. Incumbent local exchange carriers (ILECs), competitive local exchange carriers (CLECs), and other telecommunication providers have begun to explore offering voice-over-Digital-Subscriber-Line (VoDSL) service, and other voice-over-broadband services, to deliver integrated voice and data services.

A central component of a typical voice-over-broadband system is the voice gateway. The voice gateway receives telecommunications information in a packetized format from the customer premises via network ports in a network interface, reformats the packetized data from the network ports into a telephony format, and sends the telephony data to a public switched telephone network (PSTN) via telephony ports in a telephony interface. Likewise, telephony data from the PSTN is received at the telephony ports, packetized, and then transmitted to users via the network ports.

Typically, the telephones, computers, and other telecommunication equipment at the customer premises are connected to the voice gateway via an ATM network, the network interface is a broadband interface, and the network ports are wide area network (WAN) ATM ports. The network ports may connect to an ATM/IP network, a Digital Subscriber Line Access Multiplexor (DSLAM), or a Cable Modem Termination System (CMTS), for example. The network ports may reside on removable cards or blades that plug in to the voice gateway. Several different techniques are available for packetizing telecommunication information and for transporting information such as packetized voice. Those techniques include, without limitation, the Voice-over-Internet-Protocol (VoIP) protocol, the Voice-over-Asynchronous-Transfer-Mode (VoATM) protocol, the ATM Adaptation Layer Type 2 Broadband Loop Emulation Service (AAL2 BLES) protocol, and the Voice over IP over ATM (VoIPoATM) protocol for transporting IP over ATM Adaptation Layer Type 5 (AAL5).

In any case, the primary function of a voice gateway is to serve as a bridge between existing telephony platforms (which use Class-5 switches, GR-303 and TR-08 interfaces, V5.X switching and signaling protocols, Customer Premises Equipment Alerting Signal (CAS) tones, etc.) and modern data network interfaces (which use interfaces and architectures such as Cable Multimedia Terminal Adapters (MTAs), DSL DSLAM, Wireless Local Loop, etc.). When designing, deploying, and operating a voice gateway, it is often necessary to test the voice gateway. For example, it would be beneficial to test the end-to-end operation of a voice gateway to ensure that the different subsystems interoperate properly after the gateway is assembled but before it is deployed in the field.

Some forms of conventional test equipment are well suited for testing conventional telephony systems. Other types of test equipment are well suited for testing data networking equipment. Voice gateways, however, include equipment for communicating with telephony platforms, equipment for communicating with data network platforms such as broadband, and equipment for converting information from each of those platforms for use one the other. Conventional test equipment does not provide the functionality needed to effectively test devices like voice gateways which bridge the telephony and data network platforms.

SUMMARY OF THE INVENTION

The present invention involves a method, a system, and a program product that enable end-to-end testing of a voice gateway. In an example embodiment of a method according to the present invention, test equipment transmits a first series of packets containing test data to a network interface of the voice gateway. After the test data has been converted by the voice gateway from a network format to a telephony format and then converted back to a network format, the test equipment receives a second series of network packets containing the test data. The test equipment then analyzes the test data in the second series of network packets to determine performance characteristics of the voice gateway.

In an example embodiment, the operation of analyzing the test data from the second series of network packets includes the operations of (i) identifying bytes from the test data with byte values that represent idle insertion by a telephony interface, (ii) determining elapsed time between transmission and reception of the test data by the test equipment, (iii) identifying discrepancies between the test data that was transmitted by the test equipment and the test data that was received by the test equipment, and (iv) computing error statistics for the voice gateway, based on the identified discrepancies.

In the example embodiment, the test data in the first series of packets has a pattern that allows the test equipment to determine which packets in the first series of packets were used to transmit that test data. For example, the first series of packets may include successive Real-time Transport Protocol (RTP) frames, and the test equipment may fill successive RTP frame with different patterns, so that, when the test equipment receives the test data back from the voice gateway, the test equipment can determine which packets in the first series were used to transmit the test data to the voice gateway. In the example embodiment, the test data also allows the test equipment to identify idle bytes inserted by a telephony interface.

BRIEF DESCRIPTION OF THE DRAWINGS

Additional features, functions, and technical advantages will become apparent upon review of the following description, claims, and figures, in which:

DETAILED DESCRIPTION

Figure 1:
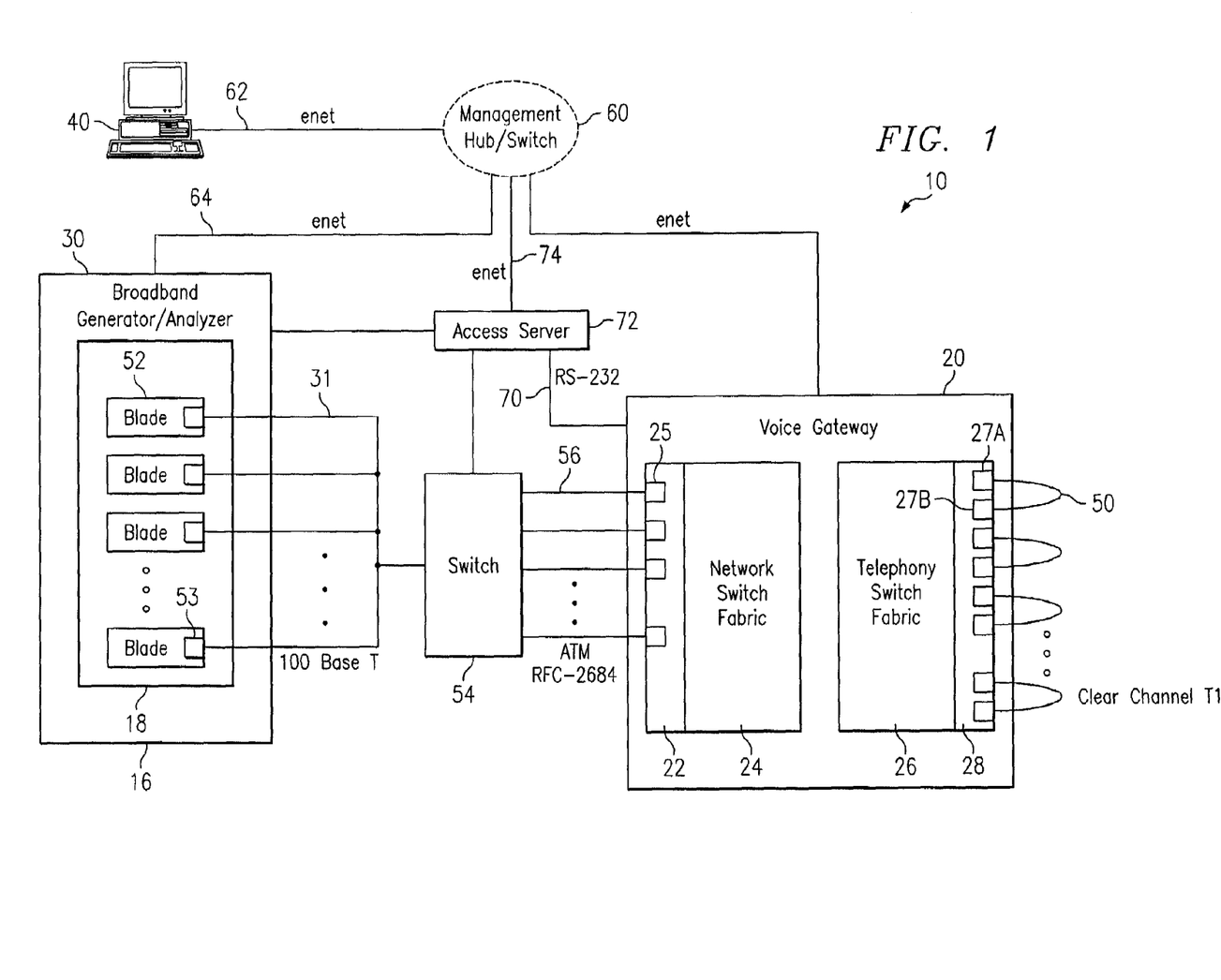
FIG. 1 presents a block diagram of an example embodiment of a system for testing end-to-end voice gateway performance.

FIG. 1 depicts an example embodiment of a system 10 that provides for end-to-end testing of voice gateway performance. Test system 10 includes a voice gateway 20, a broadband generator and analyzer (BGA) 30, and a workstation 40. As described more fully below, BGA 30 generates a series of network packets (e.g., IP packets or ATM packets) carrying payloads of data and transmits the packetized data (i.e., the payload data in the network packets) to voice gateway 20. Voice gateway 20 receives the packetized data at a network interface 22 and routes the packetized data to a telephony interface 28. Voice gateway 20 also converts the packetized data to a telephony format, such as G.711 pulse code modulation (PCM). The telephony data (i.e., the data encoded in the telephony format) is then transmitted through one or more loopback connections 50. When the data returns to telephony interface 28, voice gateway 20 converts and assembles the data into a new series of packets and transmits the new series of packets via network interface 22. BGA 30 receives the packetized data from the new series of packets and analyzes that data to determine performance characteristics of voice gateway 20. BGA 30 continues to generate, receive, and analyze packets while providing and updating test results for display on workstation 40. In addition, BGA 30 may simultaneously generate multiple data streams to provide a desired workload for voice gateway 20.

Included in voice gateway 20 are a network switch fabric 24 and a telephony switch fabric 26, which direct data coming in to the voice gateway out by the correct port. In the example embodiment, ATM is used to transport data between network switch fabric 24 and telephony switch fabric 26, and telephony switch fabric 26 performs conversion between the ATM and telephony protocols. The example embodiment enables comprehensive, end-to-end testing of voice gateway 20, in that all of the major subsystems are brought into play, including network interface 22, network switch fabric 24, telephony switch fabric 26, and telephony interface 28.

Conventional telephony test equipment (e.g., T1/E1/T3/E3 bulk call generators and analyzers) only addresses test needs for telephony equipment. Likewise, conventional broadband test equipment (e.g., generators and analyzers for 10/100/1000 Ethernet, DS-3, OC-3, and OC-12) only addresses test needs for equipment in data network platforms such as ATM, IP, and other packet-based networking environments.

It has been suggested that T1/E1 bulk call generators and analyzers (BCGAs) could be used to test a voice gateway by providing loopback connections on the network ports. However, the telephony interface of a voice gateway typically has a high count of "low speed" T1 telephone ports, which are used to connect to the PSTN Class-5 switch infrastructure. Consequently, a great deal of expensive equipment would be needed for this kind of testing if enough T1 lines are to be used to attempt to properly load the network interface. Configuring the proper physical connections between the BCGAs and the numerous T1 ports would also be a difficult logistical challenge.

Another solution is to use broadband test equipment to attack the problem from the "big pipe" stand point, with loopback connections attached to the numerous T1 ports. However, current broadband test equipment does not possess enough processing power to perform the complex tasks of handling, processing, and forwarding signaling information while generating and analyzing payload data and performing quality-of-service (QoS) measurements at line speed.

Test system 10, by contrast, reduces the processing power required of broadband test equipment by eliminating the signaling information that would normally be used to identify the proper network destination when transmitting network packets from BGA 30 and also eliminating the signaling information (e.g., "on-hook," "off-hook," etc.) that would normally be needed for telephony interface 28 to forward telephony data to the proper destination. Instead, test system 10 uses "nailed up" (i.e., static or fixed) network connections for communications between BGA 30 and voice gateway 20, and test system 10 uses "clear channel" loopback connections (i.e., 64 Kbps DS-0 G.711 PCM pipes that do not use signaling bits, comfort noise, or signal interpolation) on the T1 telephony ports.

Since RTP and ATM AAL2 packets do not utilize CRC checking, the payload data integrity is not verifiable on the network side. Additionally, after the payload data is extracted from the network packets and transported in a telephony format, such as Extended Super Frame (ESF) for T1 connections, the integrity of the data in each T1 frame is only verifiable to 98.4% accuracy, since telephony ports use only 6-bit cyclic redundancy checks (CRCs). That level does not satisfy the current accuracy requirements for transport by voice gateway customers. Consequently, to verify payload integrity for each DS-0, it is necessary to utilize a full line rate bit error rate test (BERT) generator/analyzer on the network interface.

However, conventional BGAs with per-stream BERT capability on the transmit and receive payload are typically expensive. Moreover, such BGAs require a specific type of pattern in the payload of the frames in order to calculate a bit error rate (BER). However, the frame structure of the packets that the BGA transmits is lost when the data is converted from a packetized platform such as ATM to a telephony platform such as T1/E1 time-division multiplexing (TDM). That is, the frame payload is unframed when the voice gateway converts the data to a telephony protocol, and the data is reframed along different boundaries upon return to network protocols. Therefore, it has not been possible to use BGAs to perform end-to-end testing of a voice gateway, particularly when those BGAs use a frame sequence number in the payload of each frame to determine BERs.

In addition, voice gateways insert idle bytes (e.g., bytes containing 0xFF, where the prefix "0x" indicates hexadecimal notation) into the TDM stream when incoming packet data is not present and into the packets when incoming telephony data is not present. Conventional test systems are therefore unable to precisely correlate or synchronize packet streams to TDM streams.

The example embodiment overcomes the problems of data integrity, loss of framing, and idle-byte insertion by generating bit patterns for frame payloads that allow data from multiple frames to be synchronized, despite the intermediate conversion of that data from network protocols to telephony protocols. In the example embodiment, software on BGA 30 generates an incrementing bit pattern, and that pattern is used to fill the payload of test frames to be transmitted by BGA 30. The bit pattern provides unique bytes inside the payload and acts to synchronize the BERT across multiple 80-byte typical payload frames. As described in greater detail below with reference to FIG. 4, in the example embodiment, the bit pattern within each frame is an incrementing sequence of bytes. Frame 1 is shown as starting with the value 0, and as shown in Frame 4, BGA loops back to the value 1 after reaching the value 254 (i.e., 0xFE). The byte value of 255 (0xFF) is not included in the frame payload.

The bit pattern allows bytes in the payload of incoming packets to be synchronized or correlated to transmitted packets, which allows BGA 30 to determine initial start delay as well as ongoing transmission delays. The bit pattern also allows BGA 30 to identify and discard idle bytes in the payload and to calculate the true idle delay which may have been inserted by the telephony fabric. Furthermore BGA 30 can determine the overall error rate based upon the number of mismatched bits inside of mismatched bytes in all of the sequences received, compared to the bit patterns transmitted.

In the example embodiment, BGA 30 includes a network interface 18 with eight network blades 52 that generate Ethernet/IP packets and transmit those packets to voice gateway 20 via a switch 54. Each network blade 52 includes one or more Ethernet ports 53, which are connected to switch 54 via respective Ethernet connections 31. In alternative embodiments, the BGA could use a single blade with one high-capacity port (e.g., an OC-12 port) to transmit the packets, and the switch could split the packets onto multiple network connections to multiple network ports on the voice gateway. As defined in the Microsoft Computer Dictionary, Fourth Edition, a connection is a physical link via wire, radio, fiber-optic cable, or other medium between two or more communications devices.

In FIG. 1, switch 54 is an RFC2684-capable Ethernet/ATM switch, which converts IP packets from BGA 30 into ATM packets and forwards the ATM packets to voice gateway 20 via one or more ATM connections 56. For example, switch 54 may aggregate test streams from Ethernet ports 53 onto a DS-3 link, an OC-3 link, an OC-12 link, an E-3 link, a Gigabit Ethernet link, etc.

Workstation 40, which may be a conventional personal computer or other suitable device, is used to configure and monitor BGA 30. For example, a management hub/switch 60 may interconnect workstation 40 and BGA 30 via Ethernet connections 62 and 64. Workstation 40, or a different workstation, may be used to monitor and configure voice gateway 20. For example, configuration and management information may be communicated between workstation 40 and voice gateway 20 via a serial connection 70, an access server 72, and an Ethernet connection 74. However, those with ordinary skill in the art will appreciate that many different arrangements may be used to manage and configure BGA 30 and voice gateway 20, including configurations that use Universal Serial Bus (USB) connections, General-Purpose Interface Buses (GPIBs), other types of connections, and other combinations of connections.

Figure 2:
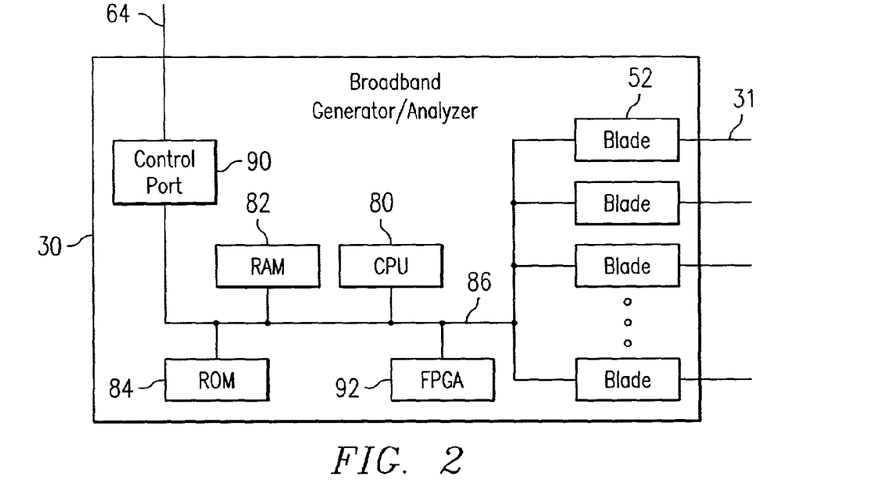
FIG. 2 presents a more detailed block diagram of the broadband generator and analyzer of FIG. 1.

Referring now to FIG. 2, in the example embodiment, BGA 30 also includes central control resources, such as ROM 84 or other nonvolatile memory, random access memory (RAM) 82, and one or more central processing units (CPUs) 80, for managing the overall operation of BGA 30. Also included are one or more system buses 86, which interconnect network blades 52, CPU 80, RAM 82, and ROM 84. In addition, BGA 30 includes a control port 90, such as an Ethernet port, a serial port, or a USB port, in communication with system bus 86, for communicating configuration and control information, user input and output, and other information with external devices. The central control resources of BGA 30 may also include one or more field-programmable gate arrays (FPGAs) 92. The various components within BGA 30 may be referred to generally as processing resources. As will be apparent to those of ordinary skill in the art, network blades 52 contain additional processing resources for generating and/or analyzing network data, including components such as FPGAs and application-specific integrated circuits (ASICs) for generating test payloads.

Figure 3:
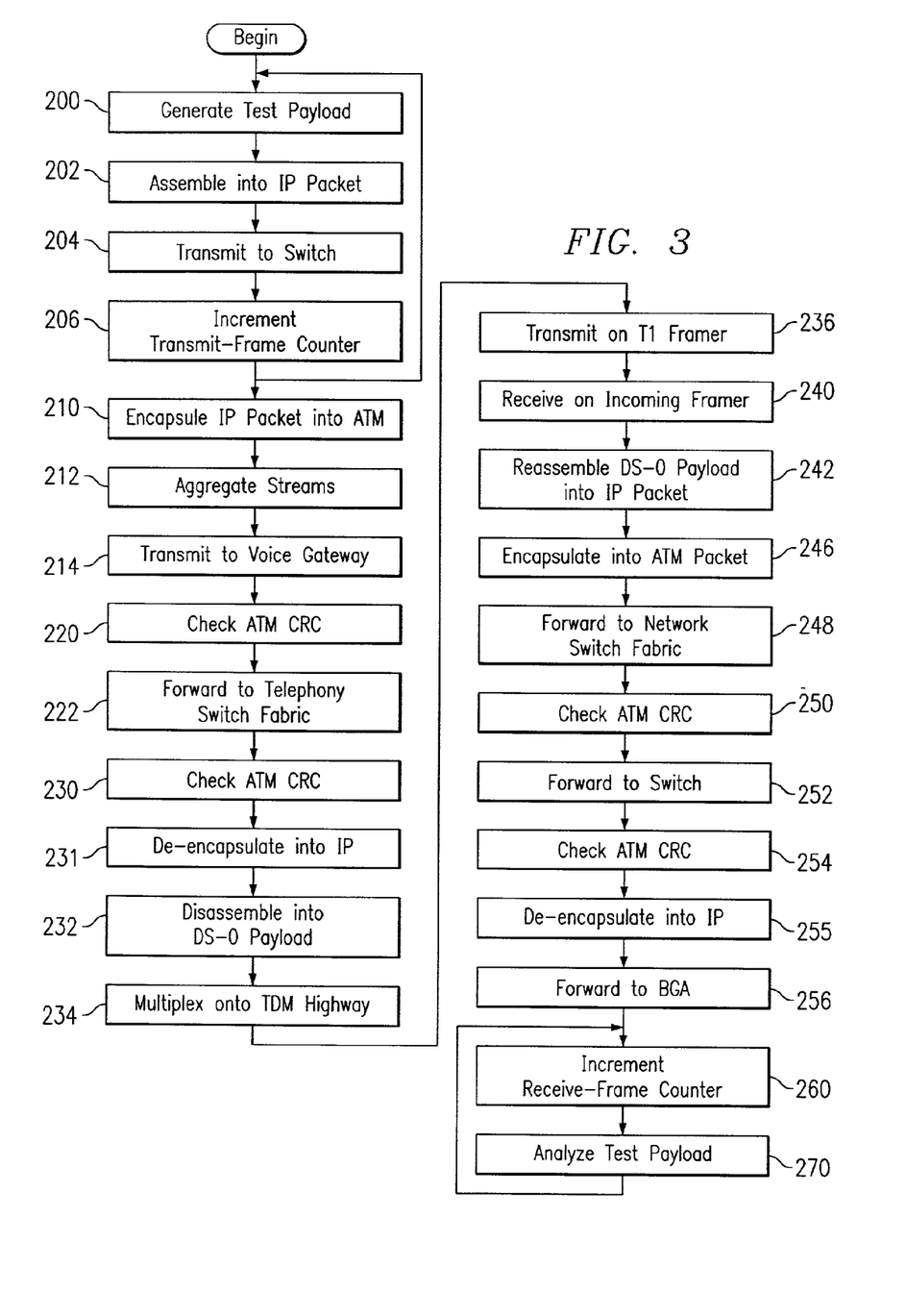
FIG. 3 presents a flowchart of an example embodiment of a method for testing a voice gateway.

FIG. 3 provides a flow chart of an example process for testing voice gateway 20. That process begins with test system 10 configured as illustrated in FIG. 1, with loopback connections 50 provided on telephony interface 28 and BGA 30 configured for nailed up network connections with switch 54 and voice gateway 20. In addition, BGA 30 will have been setup for the number of separate streams and their subsequent rates as to the percentage or portion of the maximum theoretical data transmission rate of the connections under test.

As depicted at block 200, BGA 30 then begins the testing process by generating an 80-byte test frame, encoding the equivalent of ten milliseconds of voice. BGA 30 then assembles the test frame into an IP packet, as indicated at block 202. BGA 30 then transmits the IP packet to switch 54 and increments a transmit-frame counter, as indicated at blocks 204 and 206. As indicated by the arrow returning to block 200, BGA 30 then continues to generate and transmit IP packets in accordance with configuration parameters initially set through workstation 40. Furthermore, BGA 30 performs the above operations substantially simultaneously for each network port 53, so that BGA 30 generates a series of packets for each Ethernet connection 31. The packets that BGA 30 transmits may be referred to as a first series of packets.

Figure 4:
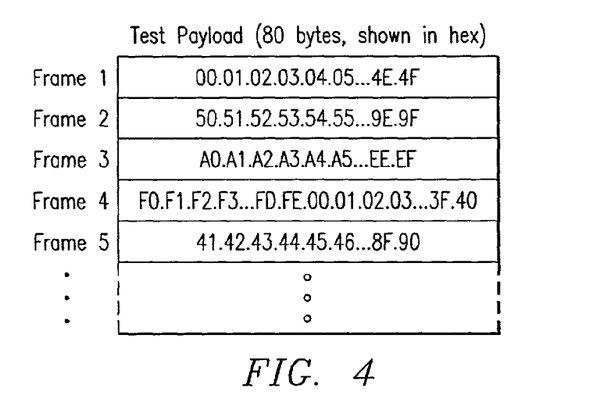
FIGS. 4 through 6 depict example data formats for test payloads, IP packets, and IP-over-ATM packets, respectively.

In addition, BGA 30 uses different bit patterns for the payloads of consecutive frames for each Ethernet port 53, to allow BGA 30 to identify the packet that was used to transmit the data when the data is later received, in a different packet, after passing through voice gateway 20. As shown in FIG. 4, in the example embodiment, BGA 30 fills the test payload for the first frame with an incrementing series of bytes, starting with the byte value 0. Thus, Frame 1 will contain 80 consecutive bytes containing the series of values from 0 to 79 (i.e., from 0x00 to 0x4F). BGA 30 continues to increment the value used for each byte when building consecutive, successive frames. The second frame will therefore contain the byte values from 80 to 159 (i.e., from 0x50 to 0x9F). As shown in Frame 4, the byte values continue to be incremented until the value 254 (0xFE) is reached. BGA 30 then loops back to zero to resume filling byte values within the test payload. Thus, the test payloads of the frames transmitted by BGA 30 do not contain the byte value that represents an idle byte (i.e., the value 255, in the example embodiment).

Figure 5:
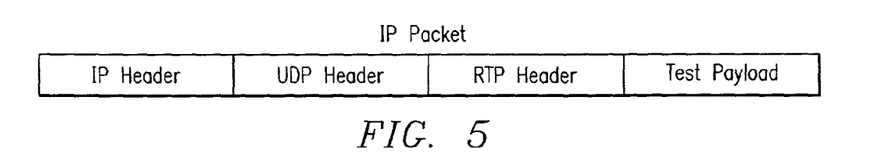
Figure 6:
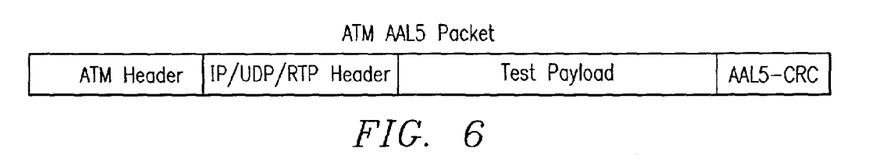

As shown in FIG. 5, each IP packet includes a test frame, as well as RTP, User Datagram Protocol (UDP), and IP headers. As indicated in FIG. 3 at block 210, once switch 54 receives an IP packet from BGA 30, switch 54 encapsulates the IP packet into ATM. Switch 54 may also aggregate streams of test data from different network blades 52, as depicted at block 212. For instance, a switch could aggregate IP packets from multiple connections with one or more BGAs onto fewer connections to a voice gateway. Once switch 54 has encapsulated the IP packet into an ATM packet, switch 54 forwards the packet via ATM connection 56 to a network port 25 in network interface 22, as shown at block 214. As indicated in FIG. 6, switch 54 converts IP packets to ATM packets by performing operations such as appending an ATM header and a CRC (e.g., an AAL5-CRC) to the IP packet.

As illustrated at block 220, when gateway 20 receives the ATM packets from switch 54, voice gateway 20 checks the ATM CRC. Voice gateway 20 then forwards the ATM packets to telephony switch fabric 26, as indicated at block 222. As shown at block 230, voice gateway 20 again checks the ATM CRC to verify that the packet made it successfully from network switch fabric 24 to telephony switch fabric 26. Then, voice gateway 20 de-encapsulates the ATM packet into an IP packet and disassembles the test payload into DS-0 PCM data, as indicated at blocks 231 and 232. As shown at block 234, voice gateway 20 then multiplexes that telephony data onto a TDM highway.

For example, twenty-four different IP addresses used by BGA 30 as the destinations for different sets of outgoing packets may have been matched with twenty-four respective DS-0s for a particular T1 port on a specific telephony module or blade within voice gateway 20. Further, the loopback connection 50 for that T1 port that may have been connected to a second T1 port, according to a predetermined test configuration. Thus, as shown in FIG. 1 and at blocks 236 and 240 of FIG. 3, the telephony data for a particular DS-0 is transmitted on a predetermined outgoing T1 port 27A and received on a predetermine incoming T1 port 27B. T1 ports may also be referred to as T1 framers.

Telephony switch fabric 28 then reassembles the telephony data from T1 port 27B into IP packet payload, as indicated at block 242. The newly assembled IP packet is then encapsulated into an ATM packet and forwarded to network switch fabric 24, as depicted at blocks 246 and 248. As shown at blocks 250 and 252, the ATM checksum is checked, and the packet is forwarded to switch 54. Switch 54 again checks the ATM checksum, as indicated at block 254, and de-encapsulates the ATM packet into an IP packet, which is forwarded to BGA 30, as shown at blocks 255 and 256.

When BGA 30 receives an IP packet, BGA 30 increments a receive-frame counter, as shown at block 260. Finally, BGA 30 analyzes the test payload within each IP packet, as depicted at block 270, to determine performance characteristics of voice gateway 20. As indicated by the arrow returning to block 260, BGA 30 then continues to receives and analyze test packets.

While the test is running, BGA 30 can also present a summary of statistics for a user at workstation 40, as well as real time alerts for exceeded thresholds, such as user-defined error rate thresholds. For example, with reference to FIG. 7, the analysis process in the example embodiment includes an operation of identifying idle bytes within the frame payload, as shown at block 300. As depicted at block 302, BGA 30 also counts the number of idle bytes in each stream and computes the maximum duration of a "hit," based on the maximum number of consecutive idle bytes received. In addition, BGA 30 correlates the test payload with the payload in the transmitted packets, as shown at block 310. That is, BGA 30 verifies the received data against the known bit patterns that were transmitted.

Figures 7, 9:
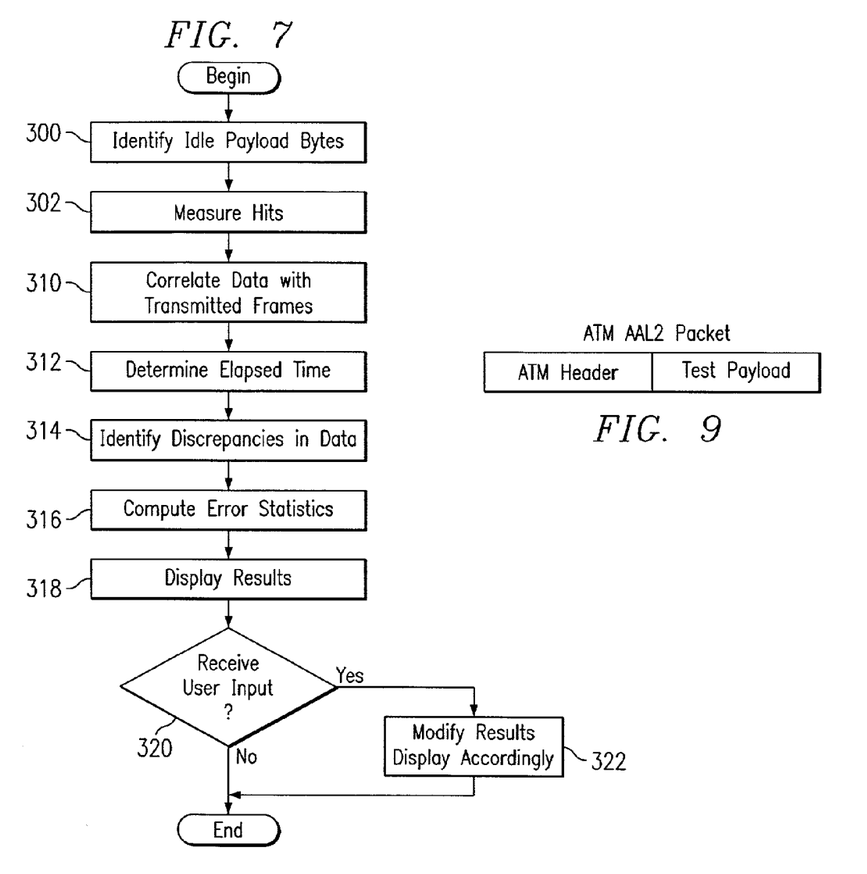
FIG. 7 presents a more detailed flowchart of example operations associated with analyzing the test payload.
FIG. 9 depicts example data formats for ATM AAL2 packets.

Then, despite any idle bytes that may have been inserted into the data stream, BGA 30 accurately determines the elapsed time between transmission of the data from BGA 30 and reception of the data by BGA 30, as indicated at block 312. BGA 30 also recognizes discrepancies in the data, such as missing data or incorrect data sequences, and extrapolates the discrepancies into a BER, as shown at blocks 314 and 316. BGA 30 also keeps count of the total number of complete, 80-byte patterns (i.e., test frames) that have been received, as well as the total number of test frames transmitted.

The analysis results are then displayed at workstation 40 as indicated at block 318. In addition, a user may interact with the analysis operation to alter which statistics are displayed and to monitor statistics in real time, as depicted at blocks 320 and 322. For example, the analysis results may include the following:

| Test payloads transmitted = 100,501 | Test payloads received = 100,501 | Delta = 0 |
|---|---|---|
| Pattern mismatches (in bytes) = 7 | | |
| Pattern mismatches (in bits) = 25 | [based on number of bits in mismatched bytes that were wrong] | |
| Bit error rate = $3.109 * 10^{-6}$ | [based on number of test payloads transmitted] | |
| Max idles discarded in pattern (max hit) = 2 (max intra-pattern delay = 250 microseconds) | | |
| Max idles discarded between test cells (max gap) = 104 (max intra-cell delay = 13 milliseconds) | | |

BGA 30 or workstation 40 then correlates results such as these to voice quality and transmission quality.

Thus, the example embodiment provides a system and method for testing devices like voice gateways that serve as bridges between the disparate telephony and data network environments. Alternative embodiments of the invention include computer-usable media encoding logic such as computer instructions for performing the operations of the invention. Such computer-usable media may include, without limitation, storage media such as floppy disks, hard disks, CD-ROMs, read-only memory, and random access memory; as well as communications media such wires, optical fibers, microwaves, radio waves, and other electromagnetic and/or optical carriers.

Although an example embodiment has been described in detail, it should be understood that many details may be changed in alternative embodiments without departing from the scope and spirit if the invention. For example, although the voice gateway's telephony ports are T1 ports in the example embodiment, different types of ports, such as E1 ports, E3 ports, T3 ports, Synchronous Transport Signal Level 1 (STS-1) ports, and other Synchronous Optical Network (SONET) TDMs, could be used in alternative embodiments. Likewise, although ATM is used in the example embodiment to forward data from network interface 22 to telephony switch fabric 28, alternative embodiments may use one or more different protocols or buses (e.g., IP, TDM, etc.) for internal data transportation.

The invention also includes alternative embodiments in which the BGA and the voice gateway communicate directly via IP packets, ATM packets or cells, or other packet-based protocols, such as AAL2. For instance, with reference to FIG. 9, when generating test data, the BGA may simply package the test payload into AAL2 packets. In addition, alternative embodiments of the invention include embodiments in which the BGA and the voice gateway communicate indirectly using protocols other than those described above. For example, alternative test systems according to the present invention include, without limitation, (i) a test system with BGA that generates Ethernet data at 10 Mbps, 100 Mbps, and/or 1000 Mbps connected directly (i.e., without a switch) to a voice gateway with a network interface that supports 10/100/1000 Ethernet communications, (ii) a test system with a BGA that generates ATM data for one or more DS3, OC3, and/or OC12 ports connected directly to a voice gateway with a network interface that supports DS3, OC3, and/or OC 12 ATM communications, (iii) a test system with a BGA that generates Ethernet data at 10 Mbps, 100 Mbps, and/or 1000 Mbps connected to an ATM voice gateway via an Ethernet/ATM switch, and (iv) a test system with a BGA that generates ATM data for one or more DS3, OC3, and/or OC12 ports connected to an Ethernet voice gateway via an ATM/Ethernet switch.

Figure 8:
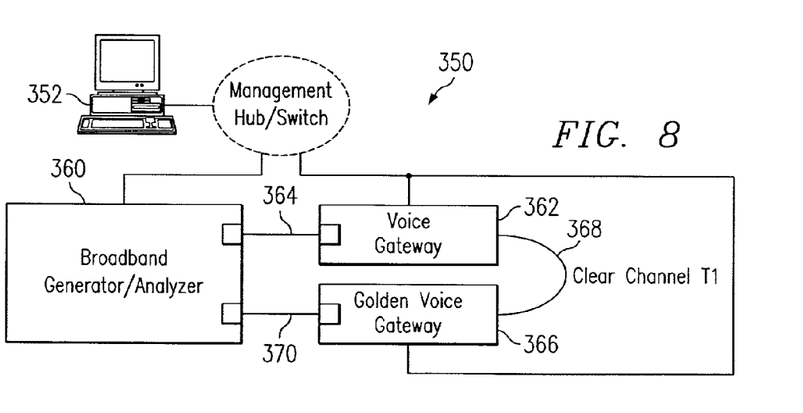
FIG. 8 presents a block diagram of an alternative embodiment of a system for testing end-to-end voice gateway performance.

Additional embodiments may use one BGA to generate test data for multiple voice gateways, multiple BGAs to generate test data for one voice gateway, or multiple BGAs to test multiple voice gateways. Furthermore, as illustrated in FIG. 8, alternative embodiments include a test system 350 that uses back-to-back voice gateways. For instance, a "golden" (i.e., known good) voice gateway 366 can be used to process return data, instead of using loopback connections on the voice gateway 362 under test. For example, test system 350 may be administered from a workstation 352, and BGA 360 may transmit packetized data to voice gateway 362 via one or more network ports and network data connections 364. Voice gateway 362 may convert the packetized data into telephony data and then transmit the telephony data to golden voice gateway 366 via one or more telephony links 368. Golden voice gateway may then convert the telephony data into packetized data and transmit the packetized data to BGA 360 via one or more different network connections 370 and different network port in BGA 360. Since golden voice gateway 366 is known to be error-free, the packetized data may be analyzed to determine end-to-end performance characteristics of voice gateway 362.

Also, although BGA 30 is depicted with central control resources and removable network blades, alternative embodiments include different BGA architectures, such as architectures with central control resources on one or more control blades, architectures with distributed control resources residing on the network blades, and architectures with BGA components provided on one or more adapter cards or blades for a personal computer of mini-computer workstation. Furthermore, the modules and components depicted in the example embodiment represent functional elements that are reasonably self-contained so that each can be designed, constructed, or updated substantially independently of the others. In alternative embodiments, however, it should be understood that the components may be implemented as hardware, software, or combinations of hardware and software for providing the functionality described and illustrated herein.

The scope of the invention is therefore not limited to the particulars of the illustrated embodiments or implementations but is defined by the appended claims.

What is claimed is:

1. A method for testing a voice gateway, the method comprising:
    transmitting a first series of network packets from test equipment to a network interface of the voice gateway, wherein the network packets contain test data, the test data including bit patterns that are synchronized across the first series of network packets;
    receiving a second series of network packets at the test equipment, wherein the second series of network packets contain the test data after the test data has been converted by the voice gateway from a network format to a telephony format and then converted back to a network format; and
    analyzing the test data in the second series of network packets to determine performance characteristics of the voice gateway.

2. The method of claim 1, further comprising:
    converting the test data from the first series of network packets to the telephony format;
    converting the test data from the telephony format into the second series of network packets; and
    transmitting the second series of network packets.

3. The method of claim 1, further comprising:
    generating the test data for each successive network packet according to a predetermined pattern, such that, when the test equipment receives the second series of network packets, the test equipment can use the test data in the second series of network packets to determine which network packets in the first series of network packets were used to transmit that test data.

4. The method of claim 1, further comprising:
    using a clear channel, pulse code modulated (PCM) protocol without signaling bits to transmit the test data in the telephony format through a telephony interface of the voice gateway.

5. The method of claim 1, further comprising:
    transmitting the test data in the telephony format through a loopback connection joining first and second ports of a telephony interface of the voice gateway.

6. The method of claim 1, further comprising:
    transmitting the test data from a transmit line on a port of a telephony interface of the voice gateway to a receive line on that port.

7. The method of claim 1, wherein the operation of transmitting the first series of network packets comprises transmitting the first series of network packets to the network interface of the voice gateway via a nailed-up network connection.

8. The method of claim 1, wherein the operation of transmitting a first series of network packets comprises transmitting Real-time Transport Protocol (RTP) packets.

9. The method of claim 1, wherein the operation of transmitting a first series of network packets comprises transmitting ATM Adaptation Layer 2 (AAL2) packets.

10. A method for testing a voice gateway, the method comprising:
    transmitting a first series of network packets from test equipment to a network interface of the voice gateway, wherein the network packets contain test data;
    receiving a second series of network packets at the test equipment, wherein the second series of network packets contain the test data after the test data has been converted by the voice gateway from a network format to a telephony format and then converted back to a network format;
    analyzing the test data in the second series of network packets to determine performance characteristics of the voice gateway;
    wherein the operation of analyzing the test data from the second series of network packets to determine performance characteristics of the voice gateway comprises:
        identifying bytes from the test data with byte values that represent idle insertion by a telephony interface;
        determining elapsed time between transmission of the test data from the test equipment and reception of the test data by the test equipment;

identifying discrepancies between the test data that was transmitted by the test equipment and the test data that was received by the test equipment; and computing error statistics for the voice gateway, based on the identified discrepancies.

11. A method for testing a voice gateway, the method comprising:

transmitting a first series of network packets from test equipment to a network interface of the voice gateway, wherein the network packets contain test data;

receiving a second series of network packets at the test equipment, wherein the second series of network packets contain the test data after the test data has been converted by the voice gateway from a network format to a telephony format and then converted back to a network format;

analyzing the test data in the second series of network packets to determine performance characteristics of the voice gateway;

generating the test data for each successive network packet according to a predetermined pattern, such that, when the test equipment receives the second series of network packets, the test equipment can use the test data in the second series of network packets to determine which network packets in the first series of network packets were used to transmit that test data;

wherein the operation of generating test data for each successive network packet according to a predetermined pattern comprises filling consecutive network packets with different bit patterns.

12. The method of claim 11, wherein the operation of filling consecutive network packets with different bit patterns comprises:

looping through a predetermined sequence of values for bit patterns occupying a byte, wherein the predetermined sequence of values does not include a byte value that represents idle insertion by a telephony interface; and using successive values from the predetermined sequence of values to fill successive bytes in the network packets, such that the test equipment can identify bytes representing idle insertion by the telephony interface.

13. A method for testing a voice gateway, the method comprising:

transmitting a first series of network packets from test equipment to a network interface of a first voice gateway, wherein the network packets contain test data;

receiving a second series of network packets at the test equipment, wherein the second series of network packets contain the test data after the test data has been converted by the first voice gateway from a network format to a telephony format and then converted back to a network format;

analyzing the test data in the second series of network packets to determine performance characteristics of the first voice gateway;

transmitting the test data in the telephony format through a telephony interface of the first voice gateway; and receiving the test data through a telephony interface of a second voice gateway;

wherein the operation of analyzing the test data from the second series of network packets comprises determining performance characteristics of at least one of the first and second voice gateways.

14. A program product for testing a voice gateway, the program product comprising:

a computer-usable medium; and computer instructions encoded in the computer-usable medium, wherein the computer instructions cause test equipment to perform operations comprising:

transmitting a first series of network packets from test equipment to a network interface of the voice gateway, wherein the network packets contain test data, the test data including bit patterns that are synchronized across the first series of network packets;

receiving a second series of network packets at the test equipment, wherein the second series of network packets contain the test data after the test data has been converted by the voice gateway from a network format to a telephony format and then converted back to a network format; and analyzing the test data in the second series of network packets to determine performance characteristics of the voice gateway.

15. The program product of claim 14, wherein the computer instructions cause the test equipment to perform further operations comprising:

generating the test data for each successive network packet according to a predetermined pattern, such that, when the test equipment receives the second series of network packets, the test equipment can use the test data in the second series of network packets to determine which network packets in the first series of network packets were used to transmit that test data.

16. The program product of claim 14, wherein the operation of transmitting the first series of network packets comprises transmitting the first series of network packets to the network interface of the voice gateway via a nailed-up network connection.

17. The program product of claim 14, wherein the operation of transmitting a first series of network packets comprises transmitting Real-time Transport Protocol (RTP) packets.

18. The program product of claim 14, wherein the operation of transmitting a first series of network packets comprises transmitting ATM Adaptation Layer 2 (AAL2) packets.

19. A program product for testing a voice gateway, the program product comprising:

a computer-usable medium; and computer instructions encoded in the computer-usable medium, wherein the computer instructions cause test equipment to perform operations comprising:

transmitting a first series of network packets from test equipment to a network interface of the voice gateway, wherein the network packets contain test data;

receiving a second series of network packets at the test equipment, wherein the second series of network packets contain the test data after the test data has been converted by the voice gateway from a network format to a telephony format and then converted back to a network format; and analyzing the test data in the second series of network packets to determine performance characteristics of the voice gateway;

wherein the operation of analyzing the test data from the second series of network packets comprises:

identifying bytes from the test data with byte values that represent idle insertion by a telephony interface;

determining elapsed time between transmission of the test data from the test equipment and reception of the test data by the test equipment;

identifying discrepancies between the test data that was transmitted by the test equipment and the test data that was received by the test equipment; and computing error statistics for the voice gateway, based on the identified discrepancies.

20. A program product for testing a voice gateway, the program product comprising:

a computer-usable medium; and computer instructions encoded in the computer-usable medium, wherein the computer instructions cause test equipment to perform operations comprising:

transmitting a first series of network packets from test equipment to a network interface of the voice gateway, wherein the network packets contain test data;

receiving a second series of network packets at the test equipment, wherein the second series of network packets contain the test data after the test data has been converted by the voice gateway from a network format to a telephony format and then converted back to a network format;

analyzing the test data in the second series of network packets to determine performance characteristics of the voice gateway;

generating the test data for each successive network packet according to a predetermined pattern, such that, when the test equipment receives the second series of network packets, the test equipment can use the test data in the second series of network packets to determine which network packets in the first series of network packets were used to transmit that test data;

wherein the operation of generating test data for each successive network packet according to a predetermined pattern comprises filling consecutive network packets with different bit patterns.

21. The program product of claim 20, wherein the operation of filling consecutive network packets with different bit patterns comprises:

looping through a predetermined sequence of values for bit patterns occupying a byte, wherein the predetermined sequence of values does not include a byte value that represents idle insertion by a telephony interface; and using successive values from the predetermined sequence of values to fill successive bytes in the network packets, whereby the test equipment can identify bytes representing idle insertion by the telephony interface.

22. A program product for testing a voice gateway, the program product comprising:

a computer-usable medium; and computer instructions encoded in the computer-usable medium, wherein the computer instructions cause test equipment to perform operations comprising:

transmitting a first series of network packets from test equipment to a network interface of a first voice gateway, wherein the network packets contain test data;

receiving a second series of network packets at the test equipment, wherein the second series of network packets contain the test data after the test data has been converted by the first voice gateway from a network format to a telephony format and then converted back to a network format;

analyzing the test data in the second series of network packets to determine performance characteristics of the first voice gateway;

wherein the operation of transmitting the first series of network packets comprises transmitting the first series of network packets to the first voice gateway;

wherein the operation of receiving the second series of network packets at the test equipment comprises receiving the second series of network packets from a second voice gateway; and wherein the operation of analyzing the test data from the second series of network packets comprises determining performance characteristics of at least one of the first and second voice gateways.

23. Test equipment for testing a voice gateway, the test equipment comprising:

a processor operable to:

transmit a first series of network packets to a network interface of the voice gateway, wherein the network packets contain test data, the test data including bit patterns that are synchronized across the first series of network packets;

receive a second series of network packets, wherein the second series of network packets contain the test data after the test data has been converted by the voice gateway from a network format to a telephony format and then converted back to a network format; and analyze the test data in the second series of network packets to determine performance characteristics of the voice gateway.

24. A system for testing voice-over-broadband equipment, the system comprising:

one or more voice gateways that have a network interface and a telephony interface;

test equipment that transmits a first series of packets to the network interface of at least one of the one or more voice gateways, wherein the packets contain test data, the test data including bit patterns that are synchronized across the first series of packets;

processing resources in the one or more voice gateways that convert the test data from the first series of packets from to a telephony format, convert the test data from the telephony format to a network format, and transmit a second series of packets containing the test data in the network format;

a network interface in the test equipment that receives the second series of packets; and processing resources in the test equipment that analyze the test data from the second series of packets to determine performance characteristics of the voice gateway.

* * * * *